United States Patent Office 2,914,484
Patented Nov. 24, 1959

2,914,484

PROCESS FOR BREAKING EMULSIONS OF THE OIL-IN-WATER CLASS

Louis T. Monson, La Puente, and Fred W. Jenkins, Los Angeles, Calif., assignors to Petrolite Corporation, Los Angeles, Calif., a corporation of Delaware No Drawing. Application March 4, 1957
Serial No. 643,542

8 Claims. (Cl. 252—331)

This invention relates to a process for resolving or separating emulsions of the oil-in-water class, by subjecting the emulsion to the action of certain chemical reagents.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field emulsions containing small proportions of crude petroleum oil relatively stably dispersed in water or brine are representative oil-in-water emulsions. Other oil-in-water emulsions include: certain oil-refinery emulsions, in which a petroleum distillate occurs as a dispersion in water; steam cylinder emulsions, in which traces of lubricating oil are found dispersed in condensed steam from steam engines and steam pumps; wax-hexane-water emulsions, encountered in de-waxing operations in oil refining; butadiene tar-in-water emulsions, in the manufacture of butadiene from heavy naphtha by cracking in gas generators, and occurring particularly in the wash box waters of such systems; emulsions of "flux oil" in steam condensate produced in the catalytic dehydrogenation of butylene to produce butadiene; styrene-in-water emulsions, in synthetic rubber plants; synthetic latex-in-water emulsions, in plants producing co-polymer butadiene-styrene or GRS synthetic rubber; oil-in-water emulsions occurring in the cooling water systems of gasoline absorption plants; pipe press emulsions from steam-actuated presses in clay pipe manufacture; emulsions of petroleum residues-in-diethylene glycol, in the dehydration of natural gas.

In other industries and arts, emulsions of oily materials in water or other non-oily media are encountered, for example, in sewage disposal operations, synthetic resin emulsion paint formulation, milk and mayonnaise processing, marine ballast water disposal, and furniture polish formulation. In cleaning the equipment used in processing such products, diluted oil-in-water emulsions are inadvertently, incidentally, or accidentally produced. The disposal of aqueous wastes is, in general, hampered by the presence of oil-in-water emulsions.

Essential oils comprise non-saponifiable materials like terpenes, lactones, and alcohols. They also contain saponifiable esters or mixtures of saponifiable and non-saponifiable materials. Steam distillation and other production procedures sometimes cause oil-in-water emulsions to be produced, from which the valuable essential oils are difficulty recoverable.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

The foregoing examples illustrate the fact that, within the broad genus of oil-in-water emulsions, there are at least three important sub-genera. In these, the dispersed oily material is respectively non-saponifiable, saponifiable and a mixture of non-saponifiable and saponifiable materials. Among the most important emulsions of non-saponifiable material in water are petroleum oil-in-water emulsions. Saponifiable oil-in-water emulsions have dispersed phases comprising, for example, saponifiable oils and fats and fatty acids, and other saponifiable oily or fatty esters and the organic components of such esters to the extent such components are immiscible with aqueous media. Emulsions produced from certain blended lubricating compositions containing both mineral and fatty oil ingredients are examples of the third sub-genus.

Oil-in-water emulsions contain widely different proportions of dispersed phase. Where the emulsion is a waste product resulting from the flushing with water of manufacturing areas or equipment, the oil content may be only a few parts per million. Resin emulsion paints, as produced, contain a major proportion of dispersed phase. Naturally-occurring oil-field emulsions of the oil-in-water class carry crude oil in proportions varying from a few parts per million to about 20%, or even higher in rare cases.

The present invention is concerned with the resolution of those emulsions of the oil-in-water class which contain a minor proportion of dispersed phase, ranging from about 20% down to a few parts per million. Emulsions containing more than about 20% of dispersed phase are commonly of such stability as to be less responsive to the presently disclosed reagents, possibly because of the appreciable content of emulsifying agent present in such systems, whether intentionally incorporated for the purpose of stabilizing them, or not.

Although the present invention relates to emulsions containing as much as about 20% dispersed oily material, many if not most of them contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not mean that any sharp line of demarcation exists, and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

In emulsions having high proportions of dispersed phase, appreciable amounts of some emulsifying agent are probably present, to account for their stability. In the case of more dilute emulsions, containing 1% or less of dispersed phase, there may be difficulty in accounting for their stability on the basis of the presence of an emulsifying agent in the conventional sense. For example, steam condensate frequently contains very small proportions of refined petroleum lubricating oil in extremely stable dispersion; yet neither the steam condensate nor the refined hydrocarbon oil would appear to contain anything suitable to stabilize the emulsion. In such cases, emulsion stability must probably be predicated on some basis other than the presence of an emulsifying agent.

The present process, as stated above, appears to be effective in resolving emulsions containing up to about 20% of dispersed phase. It is particularly effective on emulsions containing not more than 1% of dispersed phase, which emulsions are the most important, in view of their common occurrence.

The present process is not believed to depend for its effectiveness on the application of any simple laws, because it has a high level of effectiveness when used to resolve emulsions of widely different composition, e.g., crude or refined petroleum in water or diethylene glycol, as well as emulsions of oily materials like animal or vegetable oils or synthetic oily materials in water.

Some emulsions are by-products of manufacturing procedures, in which the composition of the emulsion and its ingredients is known. In many instances, however, the emulsions to be resolved are either naturally-occurring or are accidentally or unintentionally produced; or in any event they do not result from a deliberate or premeditated emulsification procedure. In numerous instances, the emulsifying agent is unknown; and as a matter of fact an emulsifying agent, in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are either naturally-occurring or are accidentally, unintentionally, or unavoidably produced. Such emulsions are commonly of the most dilute type, containing about 1% or less of dispersed phase, although concentrations up to about 20% are herein included, as stated above.

The process which constitutes the present invention consists in subjecting an emulsion of the oil-in-water class to the action of a reagent or demulsifier of the kind subsequently described, thereby causing the oil particles in the emulsion to coalesce sufficiently to rise to the surface of the non-oily layer (or settle to the bottom, if the oil density is greater), when the mixture is allowed to stand in the quiescent state after treatment with the reagent or demulsifier.

Applicability of the present process can be readily determined by direct trial on any emulsion, without reference to theoretical considerations. This fact facilitates its application to naturally-occurring emulsions, and to emulsions accidentally, unintentionally, or unavoidably produced: since no laboratory experimentation, to discover the nature of the emulsion components or of the emulsifying agent, is required.

The reagent employed as the demulsifier in any application of our process includes a high-molal non-ionic surfactant, which surfactant is a water-dispersible oxyalkylated derivative of an oxyalkylation-susceptible starting material.

Within this broad class of suitable oxyalkylated derivatives we have found several sub-genera to be especially useful for our purpose. One such sub-genus includes that portion of the whole class whose molecule contains at least one radical having 8 or more carbon atoms in a single group, i.e., it has a concentrated or localized hydrophobic influence in the molecule. A second sub-genus which we have used successfully in our process includes certain esters of the first sub-genus, just mentioned. A third useful sub-genus is one in which the molecule is free from any radical having as many as 8 carbon atoms in a single group, i.e., is free from any concentrated or localized hydrophobic influence of the kind found in the first sub-genus mentioned above. The molecule of the reagents of this third sub-genus has radicals with 7 or fewer carbon atoms in a single group, and preferably with not more than 4 carbon atoms in a single group. A fourth sub-genus we have employed successfully to resolve oil-in-water emulsions includes those members of our broad class which will be referred to herein as being "crypto-cationic."

In the present application we will describe all of these especially suitable sub-genera; but we will describe in greatest detail and we will claim herein only those reagents whose molecule includes at least one radical having 8 or more carbon atoms in a single group.

There are three principal types or classes of surfactants: anionic, cationic, and non-ionic. In the anionic class, the molecule bears an appreciable negative charge, sufficient to cause it to migrate to the anode when its solution is exposed to direct current. Similarly, cationic surfactants bear appreciable positive charges; and their molecules tend to migrate to the cathode when their solutions are exposed to direct current. Non-ionic surfactants do not possess appreciable electric charges of either sign. However, they have the properties of surfactants generally: they adsorb positively at interfaces; they lower the surface tension of water; they ordinarily produce some foaming when their dilute aqueous solutions are agitated, etc. The present reagents are non-ionic in character.

Within our class of high-molal non-ionic surfactants we include certain sub-genera which have been termed by others "crypto-anionic" and "crypto-cationic."

A crypto-anionic surfactant is one which, although it may possess structural characteristics or properties common to anionic compounds, possesses them only in such small or submerged degree that they are not an obvious characteristic of the finished surfactant. For example, one may start with a dicarboxylic acid, HOOC—R—COOH, wherein R is a radical including nothing but carbon and hydrogen atoms; and subject such starting material to extensive oxyalkylation with ethylene oxide or propylene oxide or both, until a very large proportion of the final molecule consists of such polyoxyalkylene groups. Such finished product will be essentially non-ionic in characteristics, in spite of its origin. In properties, it will more closely resemble the oxyalkylation product prepared from water and a similar large proportion of the same alkylene oxides.

Similarly, if one starts with a basic amino compound, and introduces a large multiplicity of oxyalkylene groups by an oxyalkylation reaction, the finished product will be essentially non-ionic in character. Such amino-based surfactant is an example of a crypto-cationic non-ionic surfactant.

It should be noted that, unlike the foregoing examples wherein the polar nature of the starting material is responsible for the designation of the finished surfactant as crypto-anionic or crypto-cationic, the polar group may be introduced intermediate the preparation of the finished surfactant from a non-ionic starting material; or it may be introduced after the oxyalkylation reaction has been completed. For example, a bisulfite reaction may be employed to introduce a sulfonic group into an otherwise non-ionic molecule of large size; so that, although the final product includes such sulfonic group, it represents such a small proportion of the whole molecule that its presence is insignificant, and the molecule acts as a non-ionic surfactant.

Similarly, one may start with a non-ionic starting material; introduce an appreciable proportion of alkylene oxide residues; then introduce one or a few moles of an alkylene imine, such as ethylene imine; and then, if desired, continue the oxyalkylation. The finished high-molal surfactant, so prepared, acts as a non-ionic surfactant because the cationic properties incorporated therein by reaction with the imine are so small or so submerged as to be negligible. For example, one basic nitrogen atom will not confer noticeable cationic properties on an otherwise non-ionic compound having a molecular weight of the order of 1,000. Certainly it will not, when the molecular weight is, say, 8,000–10,000.

The reagents employed by us in practising our process must be sufficiently water-dispersible under the conditions of use as to be miscible with the external phase of the emulsions which are to be resolved. All such emulsions are of the oil-in-water class; and hence they have water, some aqueous liquid, or at least some non-oily liquid as such external phase. Miscibility of the reagent with such phase, in the proportions required, is important if the reagent is to distribute itself throughout the emulsion in such manner as to resolve the latter.

Our reagents are all high-molal oxyalkylated derivatives of oxyalkylation-susceptible starting materials. Oxyalkylated products are derivable from starting materials containing at least one labile hydrogen atom, that is, a hydrogen atom activated by the fact that it is attached to an atom of either oxygen, nitrogen or sulfur. Alcohols, carboxylic acids, phenols, amines, amides, mercaptans, are all examples of oxyalkylation-susceptible starting materials; and the products prepared from them by an oxyalkylation reaction are oxyalkylated derivatives of them.

Oxyalkylation is a well-known reaction. Ordinarily, it is achieved by reacting an oxyalkylation-susceptible starting material with an alkylene oxide like ethylene oxide, propylene oxide, butylene oxide, glycid, or methylglycid, or a carbonate of such an alkylene oxide. The free oxides are less expensive and more reactive than the carbonate forms, and hence are conventionally employed in the preparation of oxyalkylated derivatives of many oxyalkylation-susceptible starting materials. The oxyalkylation reaction using the alkylene oxides is a beautifully simple one to conduct, consisting merely in the introduction of the oxide into the starting material in presence of an alkaline catalyst (or, if the starting material is sufficiently basic, in absence of catalyst). Where large proportions of oxyalkylene radicals are to be so introduced into the starting material, a catalyst is ordinarily employed. In the oxyalkylation reaction, the oxyalkylene residue, or multiples thereof, in introduced into the starting material between the reactive or labile hydrogen atom and the adjoining oxygen, nitrogen or sulfur atom. The chain of oxyalkylene residues may be a very long one, including tens and even hundreds of recurrences of the bivalent alkylene oxide radical, —AlkO—.

The composition of such oxyalkylated derivatives is not so easily determined. Obviously, especially when the starting material includes more than one labile hydrogen atom, the reaction product is not a single compound of determinable and describable structure; it is a co-generic mixture of oxyalkylated derivatives containing alkylene oxide residue groups or chains of various sizes (that is, polyoxyalkylene radicals composed of different numbers of alkylene oxide residues). The composition of oxyalkylated derivatives is therefore to be described in terms of their process of manufacture, as above.

In one sub-genus of the present broad class of non-ionic surfactant reagents, the molecule contains at least one occurrence of a radical having at least 8 carbon atoms in a single group. Some oil-in-water emulsions we have found to be especially susceptible to such of our reagents as have present in the molecule a radical of this kind. It appears that such radical exerts a localized or concentrated hydrophobic influence which causes it to be an especially effective demulsifier when used to resolve certain oil-in-water emulsions. Such sub-genus will be particularly claimed herein.

All of our reagents are described as "high-molal," in that they have theoretical molecular weights of from about 1,000 upward to about 10,000 or even greater. They are thereby distinguished from the large mass of surfactants. Simple soaps, the first widely-used and still the most widely-known class of surfactants, have molecular weights of the order of 300. Synthetic anionic detergents like keryl benzene sulfonates are surfactants; but their molecular weights are not greater than about 350–400. Dinonylnaphthalene sulfonates have molecular weights less than 500. Cationic surfactants like cetylpyridinium bromide and benzyltriethylammonium chloride have molecular weights less than about 400. In compounds of such lower molecular weights, the influence of an anionic or a cationic element or group is significant; but, as explained above, when it is suppressed or submerged in a high-molal oxyalkylation derivative of the present class, its influence becomes negligible.

The following examples are representative of our reagents.

We will first describe examples of that sub-genus in which the molecule contains at least one radical having 8 or more carbon atoms in a single group. Among the more effective members of this sub-genus are the oxyalkylated derivatives of alkylphenol-aldehyde resins, made from difunctional $C_4$–$C_{14}$ phenols and $C_1$–$C_8$ aldehydes. Reagents of this kind have been described by others. For example, U.S. Patents Nos. 2,499,367, –368, and –370, all to Melvin De Groote and all dated March 7, 1950, contain extensive descriptions of oxyalkylated derivatives of such alkylphenolaldehyde resins. Such descriptions are incorporated herein by reference, because the resins of De Groote are suitable starting materials to produce our present reagents. In fact, many of the oxyalkylated resin derivatives disclosed by De Groote are very effective for the present purpose.

Although the De Groote reagents are known to be useful in petroleum-emulsion-resolution processes, it should be clearly stated that their use to date has been restricted to the resolution of water-in-oil class petroleum emulsions, only. There is no disclosure in the De Groote patents that the same class of reagents would be suitable for resolving oil-in-water class emulsions of petroleum or of any other oily liquid. Furthermore, although we have used reagents of the De Groote kind for nearly 10 years to demulsify petroleum emulsions of the water-in-oil class, we have only recently discovered their applicability in our present process, for resolving oil-in-water class emulsions.

*Example 1*

Commercial formaldehyde (37%), 225 pounds, is slowly introduced into a mixture of 585 pounds of aromatic petroleum solvent, 401 pounds of secondary butylphenol, and 14 pounds of 66° sulfuric acid, with stirring, the temperature being so maintained as to produce a constant evolution of water of solution and of reaction.

Heating is continued at about 150° C. till there is no further evolution of water. To the resin mass so produced is added aqueous caustic soda containing 13 pounds of NaOH. The mass is heated to drive off the water of solution. Any petroleum solvent distilled during these operations is returned to the vessel. Thereafter, with the reaction vessel at approximately 150° C., 706 pounds of ethylene oxide are slowly introduced in small increments and reacted, reaction pressure being maintained below about 20 p.s.i.g. Then, to the mass, 776 pounds of propylene oxide are similarly introduced and reacted. To reduce the viscosity of the finished oxyalkylated resin, 267 pounds of aromatic solvent are added. The mass is stirred until homogeneous. It is an effective demulsifier for oil-in-water class emulsions.

*Example 2*

Example 1 is repeated, except that paratertiary amylphenol is substituted for the butylphenol there employed; and the amounts of reactants used are 571 pounds of aromatic petroleum solvent, 417 pounds of amylphenol, 12 pounds of sulfuric acid, 214 pounds of formaldehyde, 13 pounds of NaOH, 671 pounds of ethylene oxide, and 737 pounds of propylene oxide. After completion of the reaction with propylene oxide, 250 pounds of aromatic solvent are added, and the mass is stirred until homogeneous. It effectively resolves emulsions of the oil-in-water class.

*Example 3*

Commercial formaldehyde (37%), 252 pounds, is slowly added to a mixture of 481 pounds of aromatic petroleum solvent, 511 pounds of paratertiary amylphenol, and 8 pounds of 66° sulfuric acid, with stirring, the temperature being so maintained as to produce a constant evolution of water of solution and of reaction. Heating at about 150° C. is continued until there is no further evolution of water. To the resin mass so produced are added 10 pounds of NaOH, in the form of an aqueous solution.

The mass is heated to drive off the water of solution. Any petroleum solvent distilled during these operations is returned to the mass; and a second portion of 157 pounds of solvent is added, to reduce the viscosity of the mass. Thereafter, with the reaction vessel at approximately 150° C., 329 pounds of ethylene oxide are slowly introduced in small increments, and reacted, reaction pressure being maintained below about 20 p.s.i.g. Then, 700 pounds more of aromatic petroleum solvent are added, and the mass is stirred until homogeneous. It is an effective demulsifier for emulsions of the oil-in-water class.

*Example 4*

Example 3 is repeated, except that secondary butylphenol is substituted for the paratertiary amylphenol there employed; and the amounts of reactants used are 488 pounds of aromatic petroleum solvent (in the first addition thereof), 501 pounds of butylphenol, 11 pounds of sulfuric acid, 271 pounds of formaldehyde, 11 pounds of NaOH, 160 pounds of solvent (in the second addition thereof), 294 pounds of ethylene oxide, and 629 pounds of solvent (in the third addition thereof). The product is an effective demulsifier for oil-in-water class emulsions.

*Example 5*

Example 3 is repeated, except that 685 pounds of para nonylphenol are substituted for the 511 pounds of amylphenol there used, and 441 pounds of ethylene oxide are used instead of 329 pounds. Otherwise, the procedure is as there recited. The product is an effective demulsifier for oil-in-water class emulsions.

*Example 6*

Commercial formaldehyde (37%), 271 pounds, is slowly added to a mixture of 488 pounds of aromatic petroleum solvent, 502 pounds of secondary butylphenol, and 10 pounds of 66° sulfuric acid, with stirring, the temperature being so maintained as to produce a constant evolution of water of solution and of reaction. Heating at about 150° C. is continued until there is no further evolution of water. To the resin mass so produced are added 793 pounds more of aromatic solvent, and 11 pounds of NaOH in aqueous solution. The water of solution is thereafter distilled from the mass. To 648 pounds of the resin solution so prepared is added 157 pounds more of aromatic solvent and 14 pounds of NaOH in aqueous solution; and the water so added is distilled from the mass. Then 4776 pounds of propylene oxide are slowly introduced in small increments, and reacted, reaction temperature being about 150° C., and reaction pressure not exceeding about 20 p.s.i.g. Thereafter, 625 pounds of ethylene oxide are slowly introduced in small increments and reacted, under the same reaction conditions. The finished product is an effective demulsifier for oil-in-water class emulsions.

*Example 7*

Commercial formaldehyde (37%), 265 pounds, is slowly introduced into a mixture of 526 pounds of aromatic petroleum solvent, 446 pounds of paratertiary amylphenol, and 28 pounds of sodium hydroxide, with stirring, the temperature being so maintained as to produce a constant evolution of water of solution and of reaction. Heating is continued at 150° C. till there is no further evolution of water. Any solvent distilled in the process is returned to the vessel. To the resin mass so produced, 952 pounds of propylene oxide are slowly added in small increments, and reacted, using a reaction temperature of approximately 150° C. Reaction pressure is maintained below about 20 p.s.i.g. After the propylene oxide has been completely reacted, 469 pounds more of petroleum solvent are added to reduce the viscosity of the product. The latter is an effective demulsifier for oil-in-water class emulsions.

*Example 8*

Commercial formaldehyde (37%), 158 pounds, is slowly introduced into a mixture of 700 pounds of aromatic petroleum solvent, 294 pounds of paratertiary amylphenol, and 6 pounds of 66° sulfuric acid, with stirring, the temperature being so maintained as to produce a constant evolution of water of solution and of reaction. Heating is continued at 150° C. till there is no further evolution of water. To the resin so produced is added aqueous caustic soda containing 10 pounds of NaOH. The mass is heated to drive off the water of solution. Any petroleum solvent distilled during these operations is returned to the vessel. Thereafter, with the temperature at approximately 150° C., 327 pounds of propylene oxide are slowly introduced in small increments, and reacted, reaction pressure being maintained below about 20 p.s.i.g. Then, to the mass 248 pounds of ethylene oxide are similarly introduced and reacted. The finished product is an effective oil-in-water demulsifier.

*Example 9*

Example 6 is repeated, but substituting 736 pounds of para-nonylphenol for the 502 pounds of butylphenol used in the earlier example. Otherwise the procedure is as there described. The product is an effective oil-in-water demulsifier.

*Example 10*

Example 6 is repeated but using 977 pounds of tetradecylphenol instead of the 502 pounds of butylphenol used in the earlier example. Otherwise the procedure is as there described. The product is an effective oil-in-water demulsifier.

*Example 11*

Example 6 is repeated but using 689 pounds of octylphenol instead of the 502 pounds of butylphenol used in the earlier example. Otherwise the procedure is as there described. The product is an effective oil-in-water demulsifier.

*Example 12*

Example 3 is repeated but using 642 pounds of octylphenol instead of the 511 pounds of amylphenol and 413 pounds of ethylene oxide instead of the 329 pounds of ethylene oxide used in the earlier example. Otherwise the procedure is as there described. The product is an effective oil-in-water demulsifier.

*Example 13*

Example 6 is repeated; but the resin is prepared using 147 pounds of acetaldehyde instead of the 271 pounds of commercial formaldehyde used in the earlier example. Otherwise the procedure was essentially as described therein. The product is an effective oil-in-water demulsifier.

*Example 14*

Example 6 is repeated; but the resin is prepared using 321 pounds of furfuraldehyde instead of the 271 pounds of commercial formaldehyde used in the earlier example. Otherwise the procedure was essentially as described therein. The product is an effective oil-in-water demulsifier.

*Example 15*

Example 6 is repeated; but the resin is prepared using 355 pounds of benzaldehyde instead of the 271 pounds of commercial formaldehyde used in the earlier example. Otherwise the procedure was essentially as described therein. The product is an effective oil-in-water demulsifier.

*Example 16*

Example 6 is repeated; but the resin is prepared using 382 pounds of heptaldehyde instead of the 271 pounds of commercial formaldehyde used in the earlier example. Otherwise the procedure was essentially as described therein. The product is an effective oil-in-water demulsifier.

We prefer that the oxyalkylated derivatives included in this resin-derived sub-genus contain at least 2 alkylene oxide residues for each phenolic residue, on a statistical basis. They may of course contain more than 100 or even 200 such alkylene oxide residues, in some cases.

Note that in each of the foregoing examples an alkylphenol is used as a starting material. These alkylphenols all have 6 carbon atoms in the benzene ring, plus from 4 to 14 carbon atoms in the hydrocarbon sidechain. In all instances, therefore, the finished products possess more than the required minimum of 8 carbon atoms in a single group (attached to the OH group which reacts with the alkylene oxide).

The exact size of the molecules of the resins so prepared is not known. However, it appears that, at very least, they would range from about 3 resin units (phenolic residue plus methylene bridge) to about 7 such units. On this basis, it is readily calculable that the present oxyalkylated derivatives of such a resin will have molecular weights of at least about 1,000. Extensively oxyalkylated derivatives will of course have molecular weights much higher than this, up to 10,000 or greater.

Other examples of oxyalkylated derivatives suitable for use in our process and which contain radicals having at least 8 carbon atoms in a single group are as follows:

Example 17

Dodecyl alcohol, 186 pounds, is reacted with 1320 pounds of ethylene oxide at approximately 150° C., in the presence of 10 pounds of NaOH catalyst, reaction pressure being maintained below about 20 p.s.i.g. Such oxyalkylation procedure is conventional and needs no further description. The product is an effective oil-in-water demulsifier.

Example 18

Nonylphenol, 220 pounds, is reacted with 1740 pounds of propylene oxide, then with 440 pounds of ethylene oxide, at approximately 150° C., in the presence of 30 pounds of NaOH catalyst, reaction pressure being maintained below about 20 p.s.i.g. The procedure is conventional and requires no further description. The product is an effective oil-in-water demulsifier.

Example 19

Introduce 154 pounds of alpha-terpineol into a conventional autoclave, and add 5 pounds of NaOH as a dilute aqueous solution. Heat to drive off the water of solution. Then purge the autoclave with nitrogen, and introduce propylene oxide in a small continuous stream, using a temperature of about 110–120° C., and maintaining the pressure at about 20 p.s.i.g. or less. A total of 1,160 pounds of propylene oxide is so reacted with the terpineol. The product is an effective oil-in-water demulsifier.

Example 20

To the product of Example 19, without removing it from the autoclave, introduce 440 pounds of ethylene oxide, conducting the reaction under the same conditions as there described. The product is an effective oil-in-water demulsifier.

Example 21

Substitute 150 pounds of commercial pine oil for the 154 pounds of terpineol used in Examples 19 and 20 above. Otherwise, conduct the reactions as therein described. The products are effective oil-in-water demulsifiers.

We have discovered further that certain esters of reagents of the foregoing sub-genus are very effective on some oil-in-water class emulsions. Such esters are prepared from the oxyalkylated derivative and a polycarboxy acid like maleic, phthalic, diglycolic, succinic, citric, etc. Where the oxyalkylated derivative used in the esterification process possesses only one OH group, the product can be an acidic ester containing the residues of one molecule of each kind of reactant, or a neutral ester containing the residues of one molecule of dicarboxy acid and 2 molecules of oxyalkylated derivative. Where the parent oxyalkylated derivative contains more than one OH group, it is obvious that poly-esters will result on continued reaction; and that such poly-esters may be either neutral or acidic, depending on the nature of their terminal groups. In turn, that is determined largely by the proportions of reactants employed.

We prefer to use the acidic fractional esters of this kind, as demulsifiers in our process. Accordingly, we prefer that the esters be prepared using a stoichiometric excess of the polycarboxy acid, over what would be required to produce a neutral ester.

U.S. Patent No. 2,766,213, dated October 9, 1956, to Dickson, describes reagents of this sub-generic class of esters which we find useful as demulsifiers for some oil-in-water emulsions. That description is incorporated herein by reference. As specific examples of this sub-generic class of our reagents, the following are offered:

Example 22

Charge into an autoclave 177 pounds of a conventional para amylphenol-formaldehyde resin, such as that of Example 3a of U.S. Patent No. 2,499,370, dated March 7, 1950, to De Groote, or as prepared in Example 3 above. Add 177 pounds of xylene, and 5 pounds of sodium hydroxide catalyst (as a 50% aqueous solution). Heat to distill the water so introduced. Seal the autoclave, purge with nitrogen, and, maintaining a temperature of about 125–130° C., introduce 4,640 pounds of propylene oxide. The oxide is fed continuously to the vessel, as rapidly as the resin will accept it without forcing the pressure above about 50 p.s.i.g. (If the reaction rate slows too greatly, additional catalyst may be added. Acceptance of the oxide is reduced as the addition proceeds.) To the product, in the same vessel and under the same operating conditions, ethylene oxide is introduced until a total of 660 pounds have been so reacted.

Using the esterification techniques described in the foregoing Dickson patent, No. 2,766,213, the ester of the above oxyalkylated resin is prepared. Specifically, introduce 1,000 pounds of the oxyalkylated resin into a reflux-distillation apparatus, and add 100 pounds of commercial diglycolic acid. Heat the mixture to 225° C., with stirring, and collect the water (and the trace of xylene) which distills. Stop the esterification reaction when no more water distills. The product is diluted with aromatic petroleum solvent, to reduce its viscosity and to settle any traces of crystalline salts present. The product is an effective oil-in-water demulsifier.

Example 23

Repeat Example 22, but substitute 100 pounds of maleic anhydride for the 100 pounds of diglycolic acid there employed. Otherwise the procedure is essentially the same as there employed. The product is an effective oil-in-water demulsifier.

Example 24

Repeat Example 22, but substitute 100 pounds of phthalic anhydride for the 100 pounds of diglycolic acid there employed. Otherwise the procedure is essentially the same as there employed. The product is an effective oil-in-water demulsifier.

Example 25

Repeat Example 22, but substitute 1,000 pounds of a conventional butylphenol-formaldehyde resin for the amylphenol-formaldehyde resin there used. Otherwise the procedure is essentially the same as there employed. The product is an effective oil-in-water demulsifier.

Example 26

Using 1,000 pounds of the oxyalkylated resin of Example 6, and 100 pounds of diglycolic acid, an ester is prepared by the procedure of Example 22. The product is an effective oil-in-water demulsifier.

Reference is made to U.S. Patent No. 2,562,878, dated August 7, 1951, to Blair. Although the esters with which said Blair patent is concerned are not the same as those prepared by the foregoing examples, said patent still is pertinent here because of the discussion of poly-esters it presents.

We prefer to employ such proportions of polycarboxy acid and oxyalkylated derivative of the present kind that there are present from about 1.1 to about 2.0 equivalents of carboxyl group for each equivalent of hydroxyl group taking part in the esterification reaction.

A third sub-genus within the broad class of reagents we have found useful in our process includes oxyalkylated derivatives which are free from any radical having as many as 8 carbon atoms in a single group. For example, if one prepares a relatively high-molal polypropyleneglycol and then oxyethylates it, the product is an effective demulsifier for oil-in-water emulsions. Similarly, the products prepared by first extensively oxypropylating and then oxyethylating polyethylene glycols, or prepared by extensively oxypropylating and then oxyethylating a low-molal alcohol, are effective demulsifiers for oil-in-water emulsions.

Many species of this third sub-genus of our broad class of reagents are disclosed and described in certain co-pending applications of Melvin De Groote (all now abandoned), to-wit: Serial No. 425,944, filed April 27, 1954; Serial Nos. 475,727 and -728, both filed December 16, 1954; and Serial Nos. 520,011, -012, and -013, all filed July 5, 1955. Compositions which are polyglycols or polyglycol-ethers and which possess multiple alternating segments of polyoxyalklylene radicals (or residues or groups) such as —$(C_3H_6O)_x(C_2H_4O)_y(C_3H_6O)_x$— or —$(C_2H_4O)_x(C_3H_6O)_y(C_2H_4O)_z(C_3H_6O)_y(C_2H_4O)_x$— are to be found in all these co-pending De Groote applications. Reference is therefore made to them for amplification of the present description and examples.

The carboxylic derivatives of such sub-generic products, whether prepared by oxidizing the terminal alcohol groups of a high-molal polyglycol or by esterifying such glycols with polycarboxy acids to make the acidic fractional esters thereof, are likewise useful demulsifiers of the present class.

Examples of demulsifiers of such third sub-generic class include the following:

Example 27

Dipropyleneglycol, 134 pounds, is mixed with 15 pounds of caustic soda (the latter as a 50% aqueous solution), in an autoclave. The water is distilled, the autoclave is purged with nitrogen, and introduction of propylene oxide is started, maintaining the temperature at about 125–130° C. and the reaction pressure below about 20 p.s.i.g. A total of 1,550 pounds of propylene oxide are so introduced and reacted. Thereafter, without removing the product from the autoclave, ethylene oxide is introduced and reacted under the same operating conditions until a total of 6,700 pounds have been so introduced and reacted. The product is an effective oil-in-water demulsifier.

Example 28

Repeat Example 27 above, but use only 1,130 pounds of ethylene oxide in the reaction, instead of the 6,700 pounds there used. The product is an effective oil-in-water demulsifier.

Example 29

Charge 150 pounds of triethyleneglycol and 12 pounds of caustic soda (the latter as a 50% aqueous solution) to an autoclave. Distill the water of solution, purge with nitrogen, and introduce ethylene oxide at a temperature of about 125–130° C. and a pressure of about 20 p.s.i.g. or less, until a total of 264 pounds of ethylene oxide have been so reacted. Then, without removing the product from the autoclave, introduce propylene oxide under the same operating conditions until a total of 2,900 pounds of propylene oxide have been so reacted. Then, again introduce ethylene oxide in the same way, until a total of 1,566 pounds of ethylene oxide have been so reacted. The product is an effective oil-in-water demulsifier.

Example 30

Charge 150 pounds of triethyleneglycol and 12 pounds of caustic soda (the latter as a 50% aqueous solution) to an autoclave. Distill the water of solution, purge with nitrogen, and introduce ethylene oxide at a temperature of about 125–130° C. and a pressure of about 20 p.s.i.g. or less, until a total of 968 pounds of ethylene oxide have been so reacted. Then, without removing the product from the autoclave, introduce propylene oxide under the same operating conditions until a total of 3,480 pounds of propylene oxide have been so reacted. Then, again introduce ethylene oxide in the same way, until a total of 1,756 pounds of ethylene oxide have been so reacted. The product is an effective oil-in-water demulsifier.

Example 31

Charge 206 pounds of methoxytripropyleneglycol and 15 pounds of caustic soda (the latter as a 50% aqueous solution) to an autoclave. Distill the water of solution, purge with nitrogen, and introduce propylene oxide at a temperature of about 125–130° C. and a pressure of about 20 p.s.i.g. or less, until a total of 1,821 pounds of propylene oxide have been so reacted. Then, without removing the product from the autoclave, introduce ethylene oxide under the same operating conditions until a total of 664 pounds of ethylene oxide have been so reacted. The product is an effective oil-in-water demulsifier.

Example 32

Hexylene glycol, 118 pounds, and 15 pounds of NaOH (added as a 50% aqueous solution) are put in an autoclave, and the water of solution distilled. The autoclave is then purged with nitrogen. Propylene oxide is then introduced continuously, at a temperature of about 125–130° C. and a maximum reaction pressure of about 20 p.s.i.g., until a total of 4,744 pounds has been so reacted. Then, without removing the mass from the autoclave, 2,360 pounds of ethylene oxide are introduced and reacted under the same operating conditions. The product is an effective oil-in-water demulsifier.

Example 33

The mixed high-molal polyglycol product of Example 27 is cautiously oxidized by conventional oxidizing procedures, such as reaction with hydriodic acid to convert it to the iodide; then reaction of the iodide with KCN to convert it to the nitrile; then hydrolysis of the nitrile to produce terminal carboxyl groups. The product, a high-molal ether-acid, is an effective oil-in-water demulsifier.

A fourth sub-genus within our broad class of reagents is the so-called "crypto-cationic" type. In these, although one or more atoms that would normally be expected to characterize a cationic surfactant are present, they are present only in such small proportions or are so submerged that their influence in this direction is negligible; and the finished surfactant behaves essentially as a non-ionic surfactant, in spite of the presence of such atom or atoms.

Among the non-ionic surfactants of this sub-genus of our class of reagents, the following examples are included:

*Example 34*

A mixture of triethylenetetramine and tetraethylenepentamine (40/60, by weight), 246 pounds, is charged into an autoclave. To it are added 738 pounds of aromatic petroleum solvent and 16 pounds of NaOH, the latter as an aqueous solution. The mixture is heated to distill the water of solution. Thereafter, 3,821 pounds of propylene oxide are introduced in continuous fashion, maintaining the temperature at about 125–130° C. and the maximum pressure at about 20 p.s.i.g. or less. Thereafter, without removing the mass from the vessel, 1,743 pounds of ethylene oxide are introduced and similarly reacted, using the same operating conditions. The product is an effective oil-in-water demulsifier.

Many examples of such high-molal oxyalkylated polyethylene-polyamines are described in applications Serial Nos. 456, 293, -4, -5, -6, and -7, all filed September 15, 1954, by Woodrow J. Dickson, now U. S. Patents 2,792,369, -370, -371, -372 and -373, all dated May 14, 1957. The descriptions of those Dickson applications are incorporated herein by reference.

*Example 35*

In the manufacture of ethanolamines, a residue accumulates in the still which is variously designated "Amine Residue T," "Alkanolamine SB," "Residue R," by different manufacturers. Although its composition is indefinite, it is an article of commerce and is available in large quantities. To 604 pounds of such residue in an autoclave, 38 pounds of NaOH are added, in the form of a 50% aqueous solution. The mass is then heated to about 145–150° C. to drive off the water of solution. The vessel is then purged with nitrogen. Propylene oxide is thereupon introduced continuously, maintaining the temperature at about 125–130° C. and the maximum pressure at about 20 p.s.i.g. or less, until a total of 4,397 pounds of propylene oxide has been so reacted. The product is an effective oil-in-water demulsifier.

*Example 36*

Commercial triethanolamine, 149 pounds, is placed in an autoclave, the vessel is purged with nitrogen, and propylene oxide is introduced continuously, using a reaction temperature of about 125–130° C. and a maximum pressure of about 20 p.s.i.g. or less, until a total of 250 pounds of oxide have been so reacted. Then 10 pounds of NaOH are added, in the form of a 50% aqueous solution; and the water of solution is distilled. After again purging the vessel, addition of propylene oxide is continued, until an additional 2,940 pounds have been so reacted. Then, 660 pounds of ethylene oxide are added, using the same reaction conditions. The product is an effective oil-in-water demulsifier.

*Example 37*

Ethylene diamine is available commercially as an 85% aqueous solution. To 71 pounds of such starting material in a previously-purged autoclave, are added 252 pounds of propylene oxide, using atmospheric temperature and continuing the reaction until the pressure rise so induced has subsided. Thereafter, the autoclave is heated to distill the water of solution. Then, addition of propylene oxide is continued at about 125–130° C. and a maximum pressure of about 20 p.s.i.g. or less, until a total of 2,900 pounds has been so reacted. Then, without removing the product from the autoclave, ethylene oxide is similarly introduced using the same operating conditions, until a total of 5,000 pounds has been so reacted. The product is an effective oil-in-water demulsifier.

*Example 38*

To 279 pounds of dehydroabietylamine (known commercially as "Rosin Amine D") in a previously-purged autoclave are added 250 pounds of propylene oxide, at a temperature of 125–130° C. and a maximum pressure of about 20 p.s.i.g. Then, 10 pounds of NaOH are added, as a 50% aqueous solution. The water of solution is distilled, the autoclave is again sealed, and 330 pounds of propylene oxide are similarly reacted, using the same operating conditions. Thereafter, without removing the product from the autoclave, 176 pounds of ethylene oxide are similarly reacted, using the same operating conditions. The product is an effective oil-in-water demulsifier.

*Example 39*

Example 38 above is repeated; but instead of using both propylene oxide and ethylene oxide, in the presence of a catalyst, 704 pounds of ethylene oxide are reacted in absence of the NaOH catalyst. The product is an effective oil-in-water demulsifier.

There is another sub-genus within our broad class of reagents which should be mentioned, although effectiveness of its members in our process does not appear to be as great as that of the members of other sub-genera. This is the so-called crypto-anionic type. Such reagents are prepared, for example, by extensive oxyalkylation of carboxy acid; or by introduction of a carboxyl group after extensive oxyalkylation. The following examples illustrate this sub-genus:

*Example 40*

To 134 pounds of diglycolic acid in an autoclave are added 10 pounds of sodium hydroxide, in the form of a 50% aqueous solution. After the water of solution is distilled, the autoclave is purged; and 900 pounds of propylene oxide are introduced, using a temperature of 125–130° C. and a maximum pressure of about 20 p.s.i.g. Thereafter, 200 pounds of ethylene oxide are similarly reacted, using the same operating conditions. The product is an effective oil-in-water demulsifier.

*Example 41*

A low molal polyvinyl alcohol is reacted with propylene glycol, using 440 pounds of such starting material whose average size is the decamer, and 1,000 pounds of propylene oxide, a reaction temperature of about 125–130° C., and a maximum pressure of about 20 p.s.i.g. Thereafter, by the conventional bisulfite reaction, one equivalent of $SO_3H$ is introduced into the molecule; and the product so prepared is subjected to ethylene oxide in the same procedure as above until a total of 100 pounds of ethylene oxide have been so reacted. The product, although it retains the $SO_3H$ group, is essentially non-ionic in character and properties. It is an effective oil-in-water demulsifier.

The material may be employed in the concentrated form, or it may be diluted with a suitable solvent. Water has frequently been found to constitute a satisfactory solvent, because of its ready availability and negligible cost; but in other cases non-aqueous solvents, such as aromatic petroleum solvent, have been employed in preparing reagents which were effective when used for the purpose of resolving oil-in-water emulsions. Because such reagents are frequently effective in proportions of the order of 10 to 50 parts per million, their solubility in the emulsion mixture may be entirely different from their apparent solubility in bulk, in water or oil. Undoubtedly, they have some solubility in both media, within the concentration range employed.

It should be pointed out that the superiority of the reagent contemplated in the present process is based upon its ability to separate the oil phase from certain oil-in-water class emulsions more advantageously and at lower cost than is possible with other reagents or other processes. In certain instances, it has been found capable of resolving emulsions which were not economically or effectively resolvable by any other known means.

While heat is often of little value in improving results when the present process is practised, still there are instances where the application of heat is distinctly of benefit. In some instances, adjustment of the pH of the emulsion to an experimentally determinable optimum value, will materially improve the results obtained in applying the present process.

In operating the present process to resolve an oil-in-water, emulsion, the reagent is introduced at any convenient point in the system, and it is mixed with the emulsion in any desired manner, such as by being pumped or circulated through the system or by mechanical agitation such as paddles, or by gas agitation. After mixing, the mixture of emulsion and reagent is allowed to stand quiescent until the constituent phases of the emulsion separate. Settling times and optimum mixing times will, of course, vary with the nature of the emulsions and the apparatus available. The operation, in its broadest concept, is simply the introduction of the reagent into the emulsion, the mixing of the two to establish contact and promote coalescence, and, usually, the subsequent quiescent settling of the agitated mixture, to produce the aqueous and non-aqueous emulsion phases as stratified layers.

Agitation may be achieved in various ways. The piping system through which the emulsion is passed during processing may itself supply sufficient turbulence to achieve adequate mixing of reagent and emulsion. Baffled pipe may be inserted in the flow sheet to provide agitation. Other devices such as perforated-chamber mixers, excelsior- or mineral- or gravel- or steel-shaving-packed tanks, beds of stones or gravel or minerals in open ducts or trenches may be employed beneficially to provide mixing. The introduction of a gas, such as natural gas or air, into a tank or pipe in which or through which the mixture of reagent and emulsion are standing or passing is frequently found suitable to provide desired agitation.

It has been found that the factors, reagent feed rate, agitation, and settling time are somewhat interrelated. For example, with sufficient agitation of proper intensity the settling time required can be materially shortened. On the other hand, if agitation is relatively non-procurable but extended settling time is, the process may be equally productive of satisfactory results. The reagent feed rate has an optimum range, which is sufficiently wide, however, to meet the tolerances required for the variances encountered daily in commercial operations.

Application of a suitable gas in a procedure approximating that of the froth flotation cell employed in ore beneficiation, after the present reagent has been added to the emulsion to be resolved, frequently has a favorable influence of totally unexpected magnitude. By incorporating the step of subjecting the chemicalized emulsion to the action of air in a sub-aeration type flotation cell, a clear aqueous layer is sometimes obtained in a matter of seconds, without added quiescent settling, and with approximately as much reagent. Natural gas was found to be as good a gaseous medium as was air, in this operation.

It should be distinctly understood that such aeration technique, while an important adjunct to the use of the present reagent, in some cases, is not an equivalent procedure. This may be proved by subjecting an un-chemicalized emulsion to aeration for a period of minutes without detectable favorable effect. Addition of the reagent to such aerated emulsion will produce resolution, promptly.

The details of the mechanical structures required to produce aeration suitable for the present purpose need not be given here. It is sufficient to state that any means capable of producing small gas bubbles within the body of the emulsion is acceptable for use.

The flotation principle has long been employed in the beneficiation of ores. Many patents in this art illustrate apparatus suitable for producing aeration of liquids. Reference is made to Taggart's "Handbook of Ore Dressing," which describes a large number of such devices.

The principle of aeration has been applied to the resolution of emulsions by Broadbridge, in U.S. Patent No. 1,505,944, and Bailey, in U.S. Patent No. 1,770,476. Neither of these patents discloses or suggests the present invention, as may be seen from an inspection of their contents.

Suitable aeration is sometimes obtainable by use of the principle of Elmore, U.S. Patent No. 326,411. In that ore beneficiation process, an ore pulp was passed through a vacuum apparatus, the application of vacuum liberating very small gas bubbles from solution in the water of the pulp, to float the mineral. A more recent application of this same principle is found in the Dorr "Vacuator."

The manner of practicing the present invention using aeration is clear from the foregoing description.

The order in which the reagent and the aeration step are applied is relatively immaterial. Sometimes it is more convenient to chemicalize the emulsion and subsequently to apply the aeration technique. In others, it may be more advantageous to produce a strongly frothing emulsion and then introduce the reagent into such aerated emulsion.

As stated previously, any desired gas can be substituted for air. Other commonly suitable gases include natural gas, nitrogen, carbon dioxide, oxygen, etc., the gas being used essentially for its levitation effect. If any gas has some deleterious effect on any component of the emulsion, it will obviously be desirable to use instead some other gas which is inert under the conditions of use.

In summary of the foregoing: We employ as demulsifiers for oil-in-water emulsions high-molal non-ionic surfactants having molecular weights between about 1,000 and about 10,000, said surfactants being water-dispersible oxyalkylation derivatives of oxyalkylation-susceptible starting materials. We prefer to employ here those members of this broad class as are derived by the oxyalkylation of a resin which, in turn, is prepared from a $C_1$-to-$C_{24}$-hydrocarbon 2,4,6-substituted monocyclic phenol, and a $C_1$-to-$C_8$ aldehyde, the oxyalkylene groups present in the finished reagent being selected from the class consisting of oxyethylene, oxypropylene, oxybutylene, hydroxypropylene, and hydroxybutylene.

By "2,4,6-substituted," we mean the difunctional phenol has a substituent group of the described kind, located in either the 2-position, the 4-position, or the 6-position of the aromatic ring. Of these 3 originally reactive positions, therefore, 2 are still reactive; and the phenol is therefore difunctional. As an example of our preferred reagent we cite the product of Example 2 above. Other preferred examples are the products of Examples 3 and 6 above. In fact, one of our most preferred is a ternary mixture of the products of said Examples 2, 3, and 6 above. Such preferred ternary mixture includes about 15% of the product of Example 2, 68% of the product of Example 3, and 17% of the product of Example 6.

Our reagents may be employed alone, or they may in some instances be advantageously employed admixed with other and compatible oil-in-water demulsifiers. Specifically, we have employed them to advantage with the reagents described in U.S. Patent No. 2,470,829, dated May 24, 1949, to Monson.

A further preferred example of our reagents illustrates this point. It includes 7% of the product of Example 2, 31% of the product of Example 3, 8% of the product of Example 6, 12% of an acylated amino-alcohol of the kind described in the above Monson patent, 4% of a blown castor oil of the kind described in U.S. Patent No. 2,023,979, dated December 10, 1935, to Stehr, and 38% of aromatic petroleum solvent.

Our process is commonly practised simply by introducing small proportions of our reagent into an oil-inwater class emulsion, agitating to secure distribution of the reagent and incipient coalescence, and letting the mixture stand until the oil phase separates. The proportion of reagent required will vary with the character of the emulsion to be resolved. Ordinarily proportions of reagent required are from about 1/10,000 to about 1/1,000,000 the volume of emulsion treated; but more or less may be required.

A preferred method of practising the process to resolve a petroleum oil-in-water emulsion is as follows: Flow the oil well fluids, consisting of free oil, oil-in-water emulsion, and natural gas, through a conventional gas separator, then to a conventional steel oil-field tank, of, for example, 5,000-bbl. capacity. In this tank the oil-in-water emulsion falls to the bottom, is withdrawn, and is so separated from the free oil. The oil-in-water emulsion, so withdrawn, is subjected to the action of our reagent in the desired small proportion, injection of reagent into the stream of oil-in-water emulsion being accomplished by means of a conventional proportioning pump or chemical feeder. The proportion employed in any instance is determined by trial-and-error. The mixture of emulsion and reagent then flows to a pond or sump wherein it remains quiescent and the previously emulsified oil separates, rises to the surface, and is removed. The separated water, containing relatively little to substantially none of the previously emulsified oil, is thereafter discarded.

The following will illustrate the operating steps employed to resolve a number of oil-in-water class emulsions by use of our reagents.

Example A

A natural crude petroleum oil-in-water emulsion was subjected to the product of Example 2 above, in the proportion of 1:40,000. The mixture of emulsion and demulsifier was agitated 2 minutes at 130 shakes per minute, and then allowed to stand quiescent. Separation was nearly complete after 18 hours. A check or control sample, processed the same way except that no reagent was added to it, was still brown emulsion at the end of the period.

Example B

The product of Example 3 above was used on the same emulsion as in Example A above. In the same period it gave a nearly complete separation; but the proportion required was twice as great as in that example, 1:20,000.

Example C

Another natural petroleum oil-in-water emulsion, but from a different oilfield, was subjected to the action of the product of Example 2 above, using the reagent in the proportion of 1:10,000, shaking the mixture of emulsion and reagent 300 times, and allowing it to stand for 3 hours. The separation of oil was substantially complete; whereas control samples not including said reagent were unresolved.

Example D

An emulsion of furfural-in-water, arising in a certain petroleum-refining operation, was subjected to the action of the preferred product above in which were included the products of Examples 2, 3, and 6 above, as well as an an acylated aminoalcohol and a blown oil. At a ratio of 1:160,000, the product produced a separation of the organic liquid from the water, after being shaken and allowed to stand 18 hours.

Example E

A petroleum distillate, referred to technically as "a vacuum still overhead" was emulsified in water. The product of Example 3 above was shaken with the emulsion, in the proportion of 1:667,000, for 10 minutes at 150 shakes-per-minute. After 7 minutes a fairly good separation of the distillate was obtained. When used at the ratio, 1:1,670,000, such separation was not realized.

Example F

On a second portion of the same emulsion as in Example G, the product of Example 2, above, gave a good separation of distillate at a ratio of 1:1,670,000, in 10 minutes. A control sample containing no demulsifier was still completely emulsified. When the product was used in larger proportions, results were not so good. This illustrates the commonly-observed fact that the present reagents, like conventional oil-in-water demulsifiers, can deliver less satisfactory results if used in excess.

Example G

In a petroleum refining operation a $C_4$–$C_8$ hydrocarbon was acid-treated, and then caustic-washed to neutralize the acid. An oil-in-water emulsion resulted, which was quite stubborn. The preferred composition, above, which includes as constituents the products of Examples 2, 3, and 6 above, an acylated aminoalcohol, a blown oil, and an aromatic petroleum solvent, produced immediate and spectacular resolution of the emulsion when used in the proportion, 1:20,000.

Example H

The product of Example 34 above produced a striking separation of an oil-in-water class emulsion which was a dilute synthetic rubber latex. The reagent was used at a ratio of 1:3,300; the mixture was shaken 300 times; and separation occurred in a matter of minutes.

Other examples might be cited; but the general procedure employed in resolving oil-in-water class emulsions by means of chemical reagents is not novel with us.

Throughout the foregoing description, we have referred to "oil" and to "water." By "oil" we mean any oily, non-aqueous liquid which is not soluble in or miscible with water. By "water" we mean water, aqueous solutions, and any non-oily liquid which is not soluble in or miscible with oils.

We claim:

1. A process for breaking an emulsion comprising an oil dispersed in a non-oily continuous phase, in which the dispersed phase is not greater than about 20%, characterized by subjecting the emulsion to the action of a reagent which includes a high-molal non-ionic surfactant which is an oxyalkylated derivative produced by reaction between a 2,4,6-$C_4$-to-$C_{14}$-hydrocarbon-substituted monocyclic phenol-$C_1$-to-$C_8$-aldehyde resin and an alkylene oxide having from 2 to 4 carbon atoms selected from the class consisting of ethylene oxide, propylene oxide, butylene oxide, glycid and methylglycid, the molecular weight of the oxyalkylated derivative being within the range of about 1,000 to about 10,000.

2. A process as in claim 1, in which the emulsion is a petroleum oil-in-water emulsion.

3. A process as in claim 2, in which the oxyalkylated derivative is produced by reaction between the parent resin and ethylene oxide.

4. A process as in claim 2, in which the oxyalkylated derivative is produced by reaction between the parent resin and propylene oxide.

5. A process as in claim 2, in which the oxyalkylated derivative is produced by reaction between the parent resin and both ethylene oxide and propylene oxide.

6. A process as in claim 2, wherein the oxyalkylated derivative is produced from an alkylphenol-formaldehyde resin.

7. A process as in claim 2, wherein the oxyalkylated derivative is produced from an amylphenol-formaldehyde resin.

8. A process as in claim 2, wherein the oxyalkylated derivative is produced from a butylphenol-formaldehyde resin.

(References on following page)

References Cited in the file of this patent

UNITED STATES PATENTS

| | | |
|---|---|---|
| 2,159,313 | Blair et al. | May 23, 1939 |
| 2,454,541 | Bock et al. | Nov. 23, 1948 |
| 2,514,399 | Kirkpatrick et al. | July 11, 1950 |
| 2,568,744 | Kocher | Sept. 25, 1951 |
| 2,626,937 | De Groote | Jan. 27, 1953 |
| 2,759,607 | Boyd et al. | Aug. 21, 1956 |

FOREIGN PATENTS

| | | |
|---|---|---|
| 1,009,208 | France | Mar. 5, 1952 |